United States Patent [19]

Schündehütte et al.

[11] 4,377,390
[45] Mar. 22, 1983

[54] ACETOACETIC ARYLIDE AZO DYESTUFFS FOR SYNTHETIC MATERIALS, ESPECIALLY POLYESTER

[75] Inventors: Karl H. Schündehütte, Leverkusen; Henning Reel, Cologne; Winfried Kruckenberg, Leverkusen, all of Fed. Rep. of Germany

[73] Assignee: Bayer Aktiengesellschaft, Leverkusen, Fed. Rep. of Germany

[21] Appl. No.: 267,811

[22] Filed: May 27, 1981

Related U.S. Application Data

[62] Division of Ser. No. 93,947, Nov. 14, 1979, abandoned.

[30] Foreign Application Priority Data

Nov. 24, 1978 [DE] Fed. Rep. of Germany ....... 2850915

[51] Int. Cl.³ .................... C09B 29/32; D06P 1/18
[52] U.S. Cl. ............................................ 8/671; 8/662; 8/922; 260/193
[58] Field of Search ................. 8/671, 662; 260/193

[56] References Cited

U.S. PATENT DOCUMENTS 1,082,719 12/1913 Wagner .............................. 260/193
3,925,346 12/1975 Buehler et al. ..................... 260/193

FOREIGN PATENT DOCUMENTS 1187253 9/1959 France .
938047 9/1963 United Kingdom .

OTHER PUBLICATIONS

American Ink Maker, "Relationship of Chemical Constitution to Color In", Jan. 1956, pp. 28-35.

*Primary Examiner*—A. Lionel Clingman
*Attorney, Agent, or Firm*—Sprung, Horn, Kramer & Woods

[57] ABSTRACT

Dyestuffs of the formula

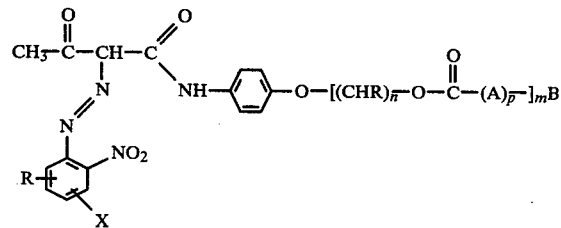

wherein
R denotes hydrogen or alkyl,
X denotes R, Cl or Br,
m and p denotes 0 or 1,
n denotes 2 to 4,
A denotes oxygen or —NR— and
B denotes $C_1$–$C_8$-alkyl, alkenyl, cycloalkyl, aralkyl or aryl,
are especially suitable for the dyeing of polyester-materials; they give deep yellow dyeings with good light fastness properties.

1 Claim, No Drawings

ACETOACETIC ARYLIDE AZO DYESTUFFS FOR SYNTHETIC MATERIALS, ESPECIALLY POLYESTER

This is a division of application Ser. No. 093.947, filed Nov. 14, 1979 now abandoned.

The invention relates to new azo disperse dyestuffs, processes for their preparation and their use for dyeing hydrophobic synthetic materials.

In one of their possible tautomeric forms, the dyestuffs, which are free from sulphonic acid groups and ammonium groups, correspond to the formula (I)

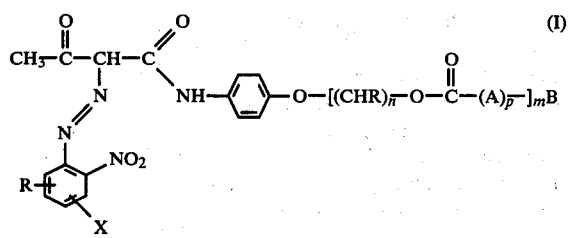

wherein
R denotes hydrogen or $C_1$–$C_4$-alkyl,
X denotes R, Cl or Br,
m denotes the number 0 or 1,
n denotes a number from 2 to 4,
p denotes the number 0 or 1,
A denotes oxygen or —NR— and
B denotes optionally substituted $C_1$–$C_8$-alkyl, alkenyl, cycloalkyl, aralkyl or aryl.

Suitable radicals R are, besides hydrogen, $CH_3$ and $C_2H_5$, linear or branched $C_3$- and $C_4$-alkyl radicals.

The straight-chain or branched alkyl radicals B have 1-8 C atoms and can be monosubstituted, for example, by CN, Cl, Br, $C_1$–$C_4$-alkoxy, phenoxy or R—$(OC_2H_4)_r$—, r denoting a number from 2 to 4.

The preferred alkenyl radical B is the allyl radical.

Suitable cycloalkyl radicals B are cyclohexyl or cyclopentyl radicals, which can be substituted, for example by methyl.

A suitable aralkyl radical B is the benzyl, phenylethyl or phenylpropyl radical.

A suitable aryl radical B is phenyl, which can be substituted by $NO_2$ or mono-, di- or tri-substituted by $CH_3$, $OCH_3$, $OC_2H_5$ or $CF_3$, or 1-naphthyl.

Preferred dyestuffs are those of the formula (II)

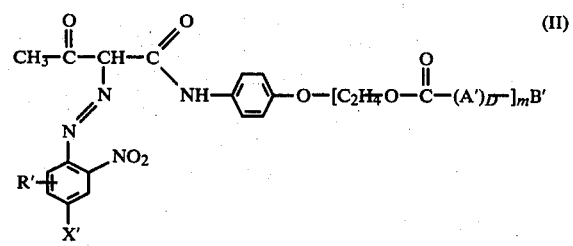

wherein
R' denotes hydrogen, $CH_3$ or $C_2H_5$,
X' denotes R' or Cl,
A' denotes oxygen or —NH—,
B' denotes $C_1$–$C_8$-alkyl which is optionally substituted by $C_1$–$C_4$-alkoxy, phenoxy, Cl or R—$(OC_2H_4)_r$—, or phenyl, tolyl, benzyl or 1-naphthyl and m, p, R and r have the abovementioned meaning.

Those dyestuffs of the formula (II) in which
m represents the number 0,
R' represents H,
X' represents $CH_3$ and
B' represents $C_1$–$C_8$-alkyl are particularly preferred.

Bulky radicals, such as, for example, t-butyl, are preferably in those positions where they cause no steric hindrance.

The new dyestuffs of the formula (I) are obtained either by a procedure in which an amine of the general formula (III)

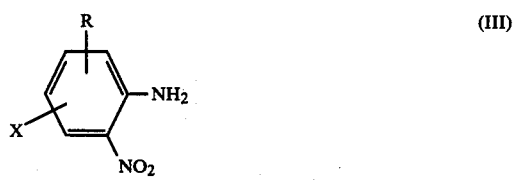

is diazotised and the diazotisation product is coupled with an acetoacetic acid arylide of the general formula (IV)

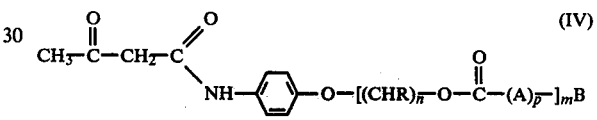

wherein
X, R, A, B, m, n and p have the abovementioned meaning,
or by a procedure in which an azo dyestuff of the general formula (V)

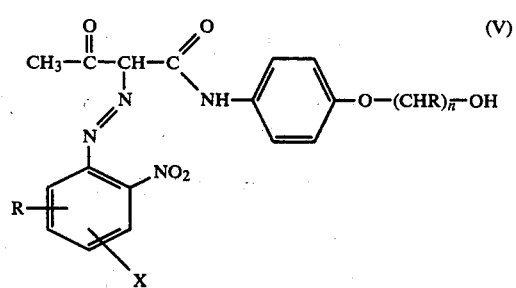

is reacted with an acylating agent of the general formula (VI) or (VII)

wherein
Z represents halogen, preferably chlorine, and
A, B and p have the abovementioned meaning,
or by a procedure in which an azo dyestuff of the general formula (VIII)

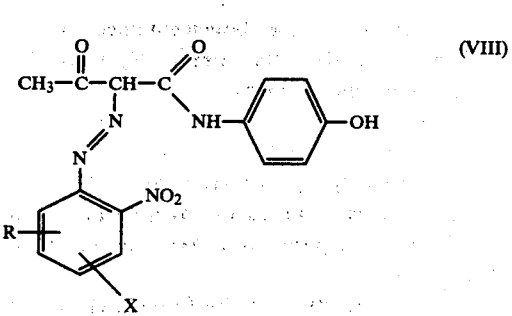

is alkylated with an alkylating agent of the general formula (IX)

wherein

B" denotes $C_1$-$C_8$-alkyl, alkenyl, cycloalkyl or aralkyl, optionally substituted by $C_1$-$C_4$-alkoxy, phenoxy, Cl or R—$(OC_2H_4)_r$—, and L denotes a leaving group, such as, for example, Cl, Br, I, $OSO_2$-phenyl, $OSO_2$-tolyl or $OSO_2OB''$.

Some of the coupling components of the general formula (IV) are known, or they are obtained by processes which are known from the literature, either by a procedure in which an amine of the general formula (X)

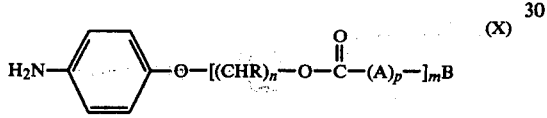

is reacted with ethyl acetoacetate or diketene, or by a procedure in which an acetoacetic arylide of the general formula (XI)

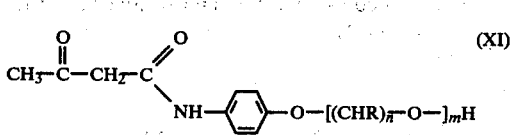

is acylated with the acylating agent (VI) or (VII) (m=1) or is alkylated with the alkylating agents (IX) (m=0).

The reaction of the dyestuffs (V) or of the acetoacetic arylides (XI), m=1, with the acylating agents (VI) or (VII) is preferably carried out in organic solvents which are inert towards (VI)/(VII), such as, for example, acetone, methyl ethyl ketone, cyclohexanone, $CH_3$-CN, toluene, chlorobenzene, dichlorobenzene or nitrobenzene, acid-binding agents, such as, for example, Na carbonate or Ca carbonate, MgO, trialkylamine or pyridine, being added if appropriate.

The dyestuffs (VIII) or the acetoacetic arylides (XI), m=0, are alkylated with the compounds (IX) in the solvents customary for alkylation reactions, acid-binding agents being added if appropriate.

The dyestuffs according to the invention, especially in the finely dispersed form, are suitable for dyeing and printing articles consisting of synthetic materials, such as, for example, polyolefines, polyvinyl compounds, cellulose 2½-acetate, cellulose triacetate and, in particular, polyester materials, for example polyethylene glycol terephthalate, or analogous polymers. When applied to these materials by the customary dyeing and printing processes, they give deep yellow dyeings and prints with good fastness properties, in particular good fastness to light.

In the examples which follow, "parts" denote parts by weight.

EXAMPLE 1

15.2 parts of 2-nitro-4-methylaniline are diazotised in 80 parts of water and 20 parts of concentrated HCl, at 0°-3° C., after adding 100 parts of ice, by adding one equivalent of 30% strength $NaNo_2$ solution dropwise. A little amidosulphonic acid is then added and, if necessary, the solution is clarified by adding 10 parts of kieselguhr.

This solution is allowed to run into a suspension, precooled to 3°-5° C., of 24.9 parts of N-(4-butoxyphenyl)-3-oxobutyramide in about 300 parts of water, during which the pH value is kept at 5 by adding 40% strength sodium hydroxide solution dropwise, and the mixture is stirred for 3-4 hours. After filtering off the product, washing it with water and drying it, about 39 parts (95% of theory) of the dyestuff of the formula

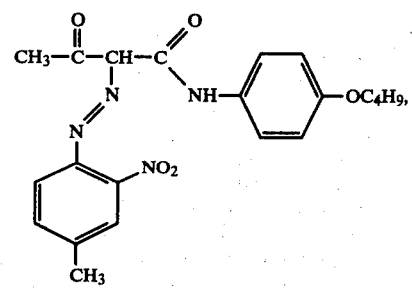

which dyes polyester materials, for example, in yellow shades with outstanding fastness properties, are obtained.

EXAMPLE 2

The diazotisation product obtained from 15.2 parts of 2-nitro-4-methylaniline is coupled with 23.7 parts of N-(4-β-hydroxyethyloxyphenyl)-3-oxo-butyramide, by the process described in Example 1.

After drying the product, about 38 parts (95% of theory) of the dyestuff

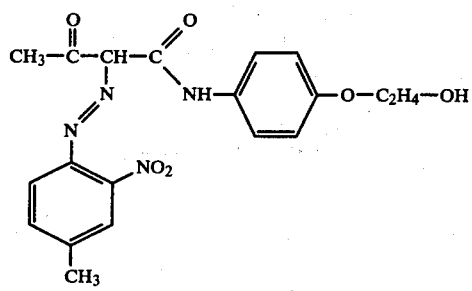

are obtained.

EXAMPLE 2a 40 parts of the dyestuff prepared according to Example 2 are heated to 110°-120° C. in about 200 parts of chlorobenzene with 10 parts of n-butylisocyanate for 4-5 hours. After this time, according to the thin layer chromatogram, the reaction has ended. After cooling the mixture, filtering off the product, washing it with methanol and drying it, about 45 parts of the dyestuff of the formula

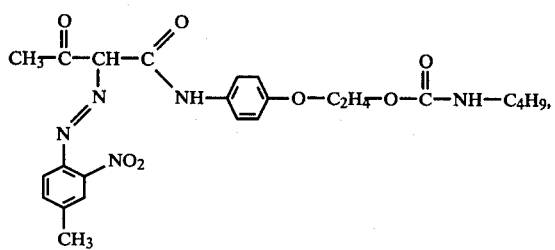

which dyes polyester materials, for example, in yellow shades with outstanding fastness properties, are obtained.

The yellow dyestuffs listed in the following tables serve to illustrate the present invention.

TABLE 1

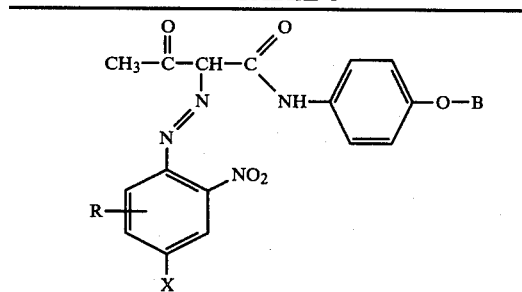

| Example No. | R | X | B |
|---|---|---|---|
| 3 | H | H | $CH_3$ |
| 4 | H | H | $C_2H_5$ |
| 5 | H | H | $CH_3-OC_2H_4$ |
| 6 | H | H | $C_4H_9$ |
| 7 | H | H | $C_6H_{13}$ |
| 8 | H | H | $CH_3-(OC_2H_4)_2-$ |
| 9 | H | $CH_3$ | $CH_3$ |
| 10 | H | $CH_3$ | $C_2H_5$ |
| 11 | H | $CH_3$ | $i-C_3H_7$ |
| 12 | H | $CH_3$ | $i-C_4H_9$ |
| 13 | H | $CH_3$ | $C_6H_{13}$ |
| 14 | H | $CH_3$ | $CH_3-OC_2H_4$ |
| 15 | H | $CH_3$ | $CH_3-(OC_2H_4)_2-$ |
| 16 | H | $CH_3$ | $CH_3-(OC_2H_4)_3-$ |
| 17 | H | $C_2H_5$ | $CH_2-C_6H_5$ |
| 18 | H | $C_2H_5$ | $C_4H_9$ |
| 19 | H | $C_2H_5$ | $CH_3-OC_2H_4$ |
| 20 | H | $C_4H_9$ | $CH_3$ |
| 21 | H | $CH_3$ | $C_6H_5$ |
| 22 | H | $C_2H_5$ | $C_6H_5$ |
| 23 | H | $i-C_3H_7$ | $C_6H_5$ |
| 24 | H | $CH_3$ | $CH_2-CH=CH_2$ |
| 25 | H | $C_2H_5$ | $CH_2-C_6H_5$ |
| 26 | $2-CH_3$ | $CH_3$ | $C_2H_5$ |
| 27 | $2-CH_3$ | $CH_3$ | $C_4H_9$ |
| 28 | $2-CH_3$ | $CH_3$ | $CH_2-C_6H_5$ |
| 29 | H | Cl | $CH_3$ |
| 30 | H | Cl | $C_2H_5$ |
| 31 | H | Cl | $C_4H_9$ |
| 32 | H | Br | $CH_3OC_2H_4$ |
| 33 | H | Br | $C_6H_{13}$ |
| 34 | $2-CH_3$ | H | $CH_3OC_3H_6$ |
| 35 | $2-CH_3$ | H | $CH_3OC_2H_4$ |
| 36 | $2-CH_3$ | H | $CH_3$ |
| 37 | $2-CH_3$ | H | $C_4H_9$ |

TABLE 2

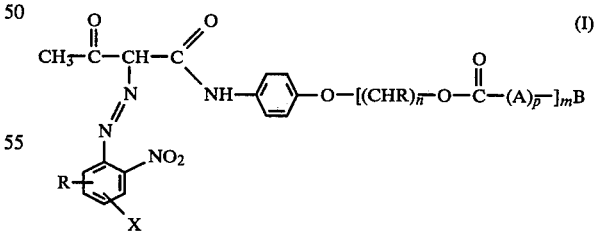

| Example No. | R | X | A | B |
|---|---|---|---|---|
| 38 | H | H | — | $CH_3$ |
| 39 | H | H | — | $C_4H_9$ |
| 40 | H | H | O | $C_2H_5$ |
| 41 | H | H | NH | $CH_3$ |
| 42 | H | H | NH | $C_4H_9$ |
| 43 | H | H | NH | $C_6H_5$ |
| 44 | H | $CH_3$ | — | $CH_3$ |
| 45 | H | $CH_3$ | — | $C_2H_5$ |
| 46 | H | $CH_3$ | — | $C_4H_9$ |
| 47 | H | $CH_3$ | — | $i-C_3H_7$ |
| 48 | H | $CH_3$ | — | $C_6H_5$ |
| 49 | H | $CH_3$ | O | $C_2H_5$ |
| 50 | H | $CH_3$ | O | $C_4H_9$ |
| 51 | H | $CH_3$ | NH | $CH_3$ |
| 52 | H | $CH_3$ | NH | $C_2H_5$ |
| 53 | H | $CH_3$ | NH | $C_3H_7$ |
| 54 | H | $CH_3$ | NH | $i-C_3H_7$ |
| 55 | H | $CH_3$ | NH | $C_4H_9$ |
| 56 | H | $CH_3$ | NH | $(CH_2)_6-Cl$ |
| 57 | H | $CH_3$ | NH | $CH_2-C_6H_5$ |
| 58 | H | $CH_3$ | NH | $C_6H_5$ |
| 59 | H | $CH_3$ | NH | $o-CH_3-C_6H_4$ |
| 60 | H | $CH_3$ | NH | $m-CH_3-C_6H_4$ |
| 61 | H | $CH_3$ | NH | $p-CH_3-C_6H_4$ |
| 62 | H | $CH_3$ | NH | $m-Cl-C_6H_4$ |
| 63 | H | $CH_3$ | NH | $2,4-(CH_3)_2-C_6H_3$ |
| 64 | H | $CH_3$ | NH | $i-C_4H_9$ |
| 65 | H | $CH_3$ | NH | $CH_2-CH=CH_2$ |
| 66 | H | $C_2H_5$ | — | $C_4H_9$ |
| 67 | H | $C_2H_5$ | O | $C_2H_5$ |
| 68 | H | $C_2H_5$ | NH | $CH_3$ |
| 69 | H | $C_2H_5$ | NH | $C_4H_9$ |
| 70 | H | $C_2H_5$ | NH | $C_6H_5$ |
| 71 | $CH_3$ | $CH_3$ | — | $C_4H_9$ |
| 72 | $CH_3$ | $CH_3$ | O | $C_2H_5$ |
| 73 | $CH_3$ | $CH_3$ | NH | $C_4H_9$ |
| 74 | $CH_3$ | $CH_3$ | NH | $C_6H_5$ |
| 75 | H | Cl | — | $CH_3$ |
| 76 | H | Cl | — | $C_4H_9$ |
| 77 | H | Cl | O | $C_2H_5$ |
| 78 | H | Cl | NH | $CH_3$ |
| 79 | H | Cl | NH | $C_4H_9$ |
| 80 | H | Cl | NH | $C_6H_5$ |
| 81 | H | Cl | NH | $CH_2-C_6H_5$ |

We claim:

1. A process for dyeing and printing synthetic fibre materials comprising employing therefor azo disperse dyestuffs of the formula (I)

wherein
R denotes hydrogen or $C_1-C_4$-alkyl,
X denotes R, Cl or Br,
m denotes the number 0 or 1,
n denotes a number from 2 to 4,
p denotes the number 0 or 1,
A denotes oxygen or —NR— and
B denotes optionally substituted $C_1-C_8$-alkyl, alkenyl, cycloalkyl, aralkyl or aryl.

* * * * *

UNITED STATES PATENT AND TRADEMARK OFFICE
CERTIFICATE OF CORRECTION

PATENT NO. : 4,377,390
DATED : March 22, 1983
INVENTOR(S) : Karl H. Schundehutte et al It is certified that error appears in the above-identified patent and that said Letters Patent is hereby corrected as shown below:

Col. 1, line 54    End of first line of formula delete "D—]$_m$B'" and insert

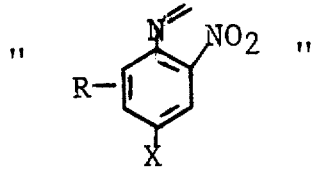

Col. 6, line 9    Bottom of formula delete

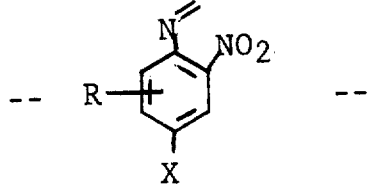

and insert

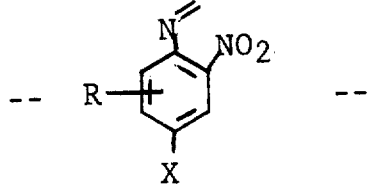

Signed and Sealed this

Fourteenth Day of June 1983

[SEAL]

Attest:

DONALD J. QUIGG

Attesting Officer     Acting Commissioner of Patents and Trademarks